Feb. 1, 1966  C. D. MOTCHENBACHER  3,232,099
MEASURING APPARATUS
Filed Nov. 6, 1962

INVENTOR.
CURTIS D. MOTCHENBACHER
BY Arthur H. Swanson
ATTORNEY.

United States Patent Office 3,232,099
Patented Feb. 1, 1966

3,232,099
MEASURING APPARATUS
Curtis D. Motchenbacher, Hopkins, Minn., assignor to Honeywell Inc., a corporation of Delaware
Filed Nov. 6, 1962, Ser. No. 235,682
5 Claims. (Cl. 73—80)

This invention relates to measuring apparatus, and more particularly, to a medical measuring instrumentality.

In accordance with the teaching of medical practice, it has been found that certain malfunctions of the human eye, such as glaucoma, produce an increase in the intra-ocular pressure. One means which has been heretofore employed in the early diagnosis of such malfunctions is a tonometer which determines the change in the pressure of the fluid within the eyeball by mechanically depressing the corneal area of the eyeball and determining the intra-ocular pressure as a function of the amount by which the cornea is depressed. Such prior art tonometers have all required physical contact between the tonometer and the eyeball. Physical contact between the instrument and the eyeball introduces serious undesirable disadvantages. The instrument must be sterilized each time it is used, the eyeball must be anesthetized; the eyeball may be damaged by abrasion; the accuracy of the measurement is determined by the skill of the operator, the steadiness of his hand and the immobility of the patient.

It is, accordingly, an object of the present invention to provide an improved tonometer.

It is another object of the present invention to provide an improved tonometer which obviates all of the foregoing disadvantages.

It is a further object of the present invention to provide an improved tonometer wherein there is no physical contact between the instrument and the eyeball under test.

In accomplishing these and other objects, there has been provided, in accordance with the present invention, a tonometer wherein the instrumentality is brought into close proximity to but not touching the eyeball under test. A calibrated puff of air is directed toward the corneal area of the eyeball causing a deformation thereof. Suitable means, either optical or capacitive, are employed for determining the amount of such deformation as a measure of intra-ocular pressure.

Figure 1:
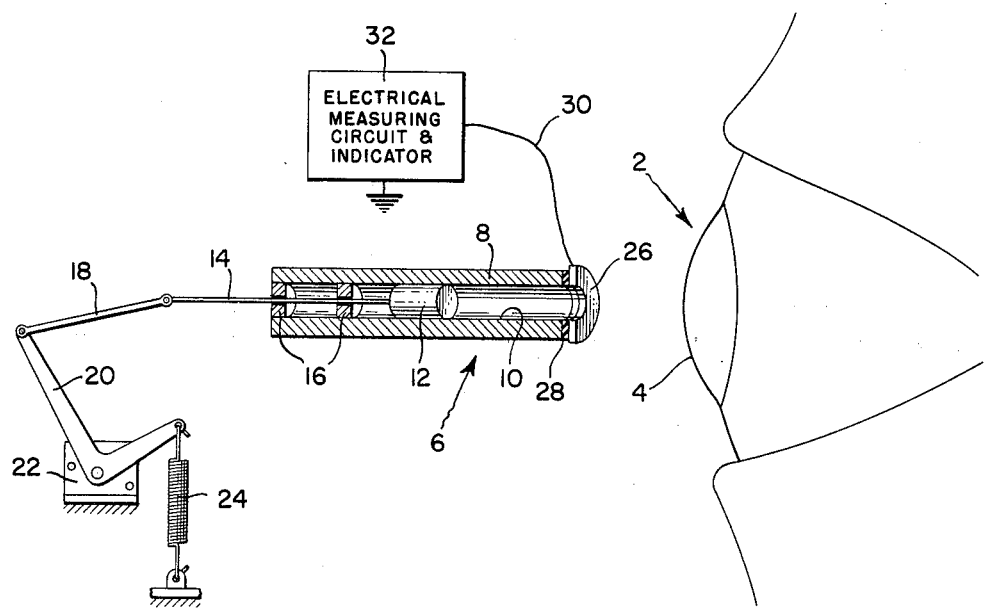
Figure 2:
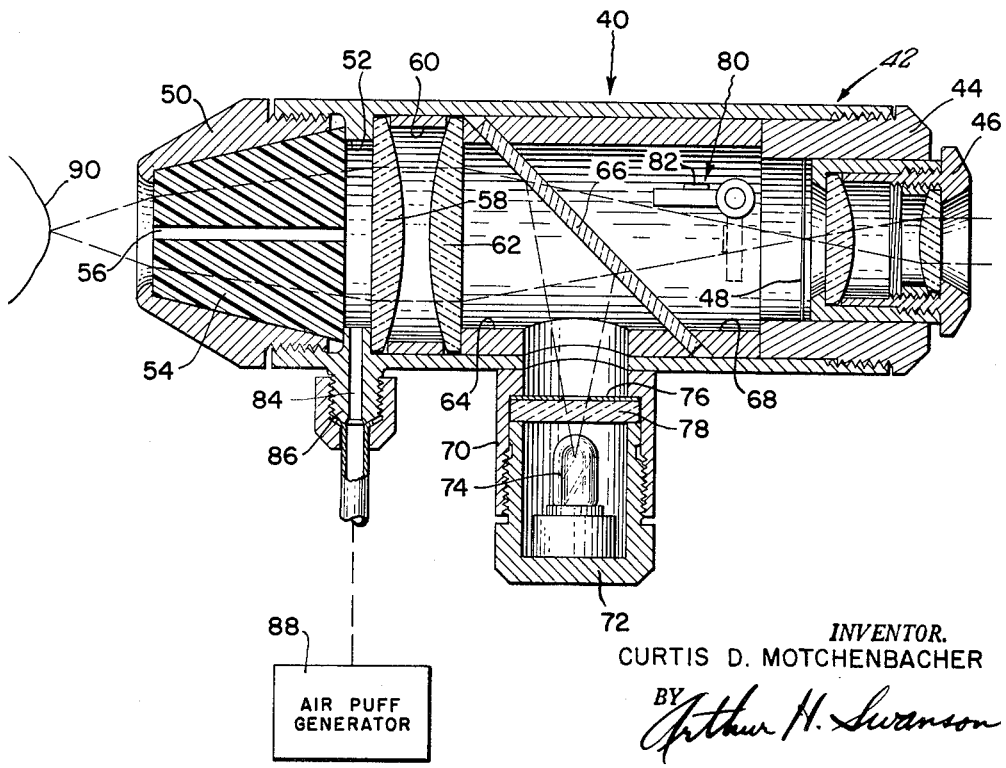

A better understanding of this invention may be had from the following detailed description when read in connection with the accompanying drawings, in which:

FIG. 1 is a schematic representation of a tonometer embodying the present invention in one form, and FIG. 2 is a cross-sectional view of a somewhat different structure embodying the present invention in another form.

Referring now to the drawings in more detail there is shown, in FIG. 1, an eyeball 2 having a corneal area 4. Positioned in front of the corneal area 4 of the eyeball 2 there is a tonometer 6. The tonometer 6 includes a tubular body member 8 having a central bore 10. Within the bore 10 there is positioned a piston 12 mounted on one end of a drive rod 14. The drive rod 14 passes through a pair of suitable guide bearings 16 to a connecting link 18 connected to the opposite end thereof. The link 18 connects the driving rod 14 to one leg of a bell-crank 20. The bell-crank 20 is pivotally supported at the elbow thereof on a suitable support member 22 which includes a pair of stop pins to limit the arcuate movement of the bell-crank 20 about the pivot. The other leg of the bell-crank 20 is connected to a tension spring 24.

To the front end of the tubular body member 8 there is secured a capacitor electrode 26. The electrode 26 is electrically isolated from the tubular body member 8 by a suitable insulator 28. The capacitor electrode 26 is connected, by a lead wire 30 to a suitable electrical measuring and indicating circuit 32. Since the particular electrical measuring and indicating circuit is not a part of the present invention and any of several well known circuits may be used, the circuitry has not been shown in detail.

In operation, the tonometer 6 of FIG. 1 is brought into close proximity to the corneal area 4 of the eyeball 2. The tonometer is positioned with the capacitor electrode 26 near to but not touching the cornea 4. The cornea of the eye itself constitutes the second electrode of the sensing capacitor. The electrode 26 may be accurately positioned relative to the cornea 4 by establishing through the operation of the electrical measuring circuit, a predetermined capacitive relationship between the cornea 4 and the electrode 26. With the proper spatial relationship established, the bell-crank 20 may be rotated, against the force of the spring 24, to the rearmost limit established by the stop members on the support member 22. This movement of the bell-crank 20 moves the piston 12 to a rearmost position within the bore 10 of the tubular member 8. If then, the bell-crank 20 is released, the operation of the spring will cause a clockwise (as viewed in FIG. 1) rotation of the bell-crank. As the bell-crank is moved by the spring 24, the piston 12 is driven forward at a velocity determined by the mechanics of the system. The forward motion of the piston 12 is limited by the other limit stop on the support member 22 in association with the bell-crank 20. The forward motion of the piston 12 within the bore 10 of the tubular member 8 produces a predetermined puff of air directed toward the adjacent corneal area 4 of the eyeball 2.

The puff of air thus produced causes a deflection or deformation of the cornea 4 by an amount which is a function of the fluid pressure within the eyeball. As the cornea is momentarily deformed by the puff of air, the spacing between the surface of the cornea 4 and the electrode 26 is correspondingly changed. This spatial change results in a corresponding change in the effective capacitance of the sensing capacitor—i.e. the electrode 26 and the cornea 4. The change in capacitance, which will be proportional to the deflection of the cornea which, in its turn, will be proportional to the intra-ocular pressure, is detected by the electrical measuring circuit to produce a signal proportional to the intra-ocular pressure.

The tonometric measurement produced in accordance with the present invention is, therefore, a measurement which may be accurately determined without the necessity of actual physical contact with the eyeball.

A somewhat different structure is shown in FIG. 2 for acomplishing non-contacting tonometry. In that form shown in FIG. 2, the tonometer 40 comprises a structure wherein the prepositioning and the detection is accomplished through optical means. There, the structure includes a main barrel or body member 42. At one end of the body member 42 there is a first end cap 44 which is threaded into the body member 42. That first end cap carries an adjustable ocular or eyepiece 46. Also carried by the first end cap 44 is a pair of crossed-hairs 48 positioned in a plane whereupon the ocular 46 may be focused. The opposite end of the body member 42 has a second end cap 50 threaded thereinto. An annular shoulder 52 is formed within the body member 42 near the end thereof which carries the second end cap. Between the lower face of the shoulder 52 and the second end cap 50 there is clamped a suitable optically transparent plug 54 which has a relatively small central bore 56.

The upper surface of the shoulder 52 forms a reference plane for the optics of the system. The first lens 58 of a pair of objective lenses rests on the upper surface of the shoulder 52. A spacer ring 60 supports a second lens 62 of the pair of objective lenses and separates that lens 62 from the first lens 58. Above the second lens 62 there is a further spacer ring 64 which rests on the upper surface of the lens 62. The upper edge of the spacer ring 64 is cut off in a plane that makes an angle of 45° with the optical axis of the tonometer. That upper surface supports and positions a half-silvered mirror 66. A complementary spacer ring 68, with its lower end cut off in a plane at 45° with the optical axis of the system, is positioned above the half-silvered mirror 66. The entire assembly is then held firmly in place by screwing down the first end cap 44 into the barrel or body member 42 until the lower edge of the cap 44 bears firmly on the upper surface of the ring 68, thus clamping the several parts between the upper surface of the shoulder 52 and the lower end of the first cap 44.

The barrel or body member 42 also carries a housing for a light source. That housing comprises a smaller auxiliary barrel 70 which is secured to and extends outwardly from the main barrel or body member 42 perpendicularly to the axis of the main barrel and at an angle of 45° to the plane of the mirror 66. A cap member 72 carries within itself a light source means 74 and is threaded into the end of the auxiliary barrel 70. Between the end of the cap member 72 and a shoulder in the auxiliary barrel 70 there is clamped a suitable aperture plate 76 and an optical filter 78.

The main barrel or body member 40 further has mounted therein a detector unit 80 which includes a photocell 82. The detector unit 80 is pivotally mounted such that it may be swung out of the optical path during set-up or orientation of the tonometer then moved into the optical path to detect the response of the cornea when the tonometer is operated.

Between the lower face of the lens 58 and the upper surface of the transparent plug 54 there is a space the thickness of which is determined by the thickness of the shoulder 52. An orifice or air passage 84 is provided through the wall of the body member 42 and the shoulder 52, opening into space between the lens 58 and the transparent plug 54. A suitable fitting or threaded boss 86 extends outwardly from the body member 42 whereby a connection may be made to a suitable source of controlled air puffs or air-puff generator 88.

In operation, the tonometer 40 is positioned adjacent an eyeball 90. The light source 74 is turned on and the light therefrom may be of any suitable wavelength characteristic. The light from the source 74 falls upon the half-silvered mirror 66 and is deflected toward the objective lens pair, lenses 58 and 62. The objective lenses cause the light to be focused at a point. The tonometer 40 is then moved, relative to the eyeball, such that the point at which the light from the source 74 comes to a focus coincides with the corneal surface of the eyeball 90. With the detector unit 80 swung out of the optical path, the light reflected from the surface of the eyeball 90 passes through the half-silvered mirror, past the crossed hairs 48, and through the ocular or eyepiece 44. By design, the optical distance from the objective lens pair to the light source 74 is made equal to the optical distance from the objective lens pair to the crossed hairs 48. Thus, by viewing through the ocular or eyepiece 46, the operator may properly adjust the tonometer relative to the eyeball. When the tonometer is properly positioned, the reflected image of the light source will appear superimposed on the crossed hairs 48 when viewed through the eyepiece 46.

With the tonometer 40 thus properly positioned, the detector unit 80 may be swung up into the optical path of the instrument so that the light reflected from the cornea of the eyeball 90 falls upon the photocell 82. That light establishes a reference level for the signal developed by the photocell, which may, in turn, be transmitted to suitable electronic measuring and indicating means (not shown). Under these conditions a predetermined puff of air is transmitted from the generator 88, through the inlet pasage 84, out through the bore 56 toward the cornea of the eyeball 90. The surface of the eyeball will be deflected or deformed by the air puff by an amount which is proportional to the intra-ocular pressure. That distortion produces a corresponding change in the intensity of the light falling on the photocell 82 due to the defocusing effect of the distortion. The photocell 82, in turn, produces a change in the electric signal developed thereby, which change is proportional to the to the intra-ocular pressure of the eyeball.

The structure shown in FIG. 2 is specifically shown, described and claimed in a copending application filed on even date herewith in the name of Norman L. Stauffer and assiged to the same assignor as the present case.

Thus, this structure, also, provides a means for obtaining a tonometric measurement without the necessity of establishing physical contact between the measuring instrument and the eyeball. Inasmuch as there is no physical contact with the eyeball, there is no necessity for anesthetizing the eye, there is no necessity for sterilizing the equipment after each use, there is no likelihood of damaging the corneal area of the eyeball by abrasion, and the operation can be performed more accurately and without the necessity of the high order of skill of the operator required by previous tonometers.

What is claimed is:

1. A non-contacting tonometer comprising means for generating a controlled air-puff, means for directing said air-puff to impinge upon the corneal area of an eyeball under test whereby to cause deformation of said corneal area of said eyeball by said air-puff, and means for measuring the amount of said deformation as a function of intra-ocular pressure.

2. A non-contacting tonometer comprising means for generating a controlled air-puff, means for directing said air-puff to impinge upon the corneal area of an eyeball under test whereby to cause deformation of said corneal area of said eyeball by said air-puff, and electrical means for measuring the magnitude of said deformation as a function of intra-ocular pressure.

3. The invention as set forth in claim 2 wherein said electrical means includes a capacitive pick-up means.

4. A non-contacting tonometer comprising a tubular body member having an axial opening therethrough, means associated with said axial opening for producing a controlled puff of air through said opening, said tonometer being adapted to be positioned adjacent the corneal area of an eyeball under test such that said puff of air issuing from said opening causes a deformation of said corneal area of said eyeball, and capacitive electrical pick-up means carried by said body member adjacent said eyeball to detect the magnitude of said deformation of said corneal area as a function of intra-ocular pressure.

5. The invention as set forth in claim 4 wherein said means associated with said axial opening for producing a controlled puff of air comprises a piston movably mounted in said axial opening, and means for moving said piston in said opening to produce said puff of air.

References Cited by the Examiner
UNITED STATES PATENTS 2,512,372   6/1950   Pakala     331—65 X
2,708,928   5/55   Zenatti     73—80 X LOUIS R. PRINCE, *Primary Examiner.*

RICHARD C. QUEISSER, *Examiner.*